(12) United States Patent
Yamamura et al.

(10) Patent No.: US 6,700,245 B2
(45) Date of Patent: Mar. 2, 2004

(54) MOTOR HAVING MOTOR MAIN BODY AND SPEED REDUCING UNIT

(75) Inventors: Kengo Yamamura, Inasa-gun (JP); Toshihiro Saitou, Toyohashi (JP); Hiroaki Yamamoto, Toyohashi (JP); Youichi Matsuyama, Shinshiro (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/314,353

(22) Filed: Dec. 9, 2002

(65) Prior Publication Data

US 2003/0122435 A1 Jul. 3, 2003

(30) Foreign Application Priority Data

Dec. 27, 2001 (JP) .......................................... 2001-397355

(51) Int. Cl.7 ............................ H02K 7/108; H02K 5/04
(52) U.S. Cl. ....................................... 310/75 R; 192/38
(58) Field of Search ............................... 310/75 R, 78, 310/75 D; 192/38, 42, 44

(56) References Cited

U.S. PATENT DOCUMENTS

| | | | |
|---|---|---|---|
| 6,242,824 B1 * | 6/2001 | Torii et al. ..................... | 310/42 |
| 6,481,550 B2 * | 11/2002 | Yamamoto et al. ........... | 192/44 |
| 6,550,599 B2 * | 4/2003 | Kudou et al. ............. | 192/223.2 |
| 2002/0158527 A1 | 10/2002 | Kawakami et al. ........... | 310/78 |

FOREIGN PATENT DOCUMENTS

JP    A-2001-336550    12/2001    ............ H02K/7/10

* cited by examiner

Primary Examiner—Burton Mullins
(74) Attorney, Agent, or Firm—Posz & Bethards, PLC (57) ABSTRACT

A rotatable shaft of a motor main body and a worm shaft of a speed reducing unit are drivingly coupled to each other by a clutch. Surrounding walls, which are arranged radially outward of the clutch to substantially entirely surround the clutch in an imaginary plane that extends substantially perpendicular to the axis of the worm shaft, are formed integrally with a gear housing. Thus, the surrounding walls restrain outward movement of grease, which is applied to predetermined portions of the clutch, so that effluence of the grease from the clutch is restrained.

8 Claims, 9 Drawing Sheets

MOTOR HAVING MOTOR MAIN BODY AND SPEED REDUCING UNIT

CROSS REFERENCE TO RELATED APPLICATION

This application is based on and incorporates herein by reference Japanese Patent Application No. 2001-397355 filed on Dec. 27, 2001.

BACKGROUND OF THE INVENTION

1. Field of the Invention

The present invention relates to a motor that includes a coupling means for coupling between a rotatable shaft of a motor main body and a worm shaft of a speed reducing unit.

2. Description of Related Art

A motor is used as a drive source for a power window system installed in a vehicle door. Such a motor includes a motor main body and a speed reducing unit, which are drivingly coupled together. The motor main body rotates a rotatable shaft. The speed reducing unit receives a speed reducing mechanism that reduces rotational speed of the rotatable shaft. The motor for the power window system needs to have an arrangement, which restrains rotation of an output shaft of the motor when rotational force is applied to the output shaft due to a downward load exerted to a window glass, for example, by a weight of the window glass of the parked-vehicle or by vibrations of the running vehicle.

To address the above disadvantage, various motors for the power window system have been proposed. One such motor includes a clutch that is interposed between the rotatable shaft of the motor main body and the worm shaft of the speed reducing mechanism. The clutch transmits rotational force of the rotatable shaft, which is rotated upon operation of the motor main body, to the worm shaft to transmit the rotational force to an output shaft of the motor. However, when rotational force is applied to the output shaft from the load side, the clutch restrains rotation of the output shaft of the motor by restraining rotation of the worm shaft.

Lubricant, such as grease, is applied to predetermined portions of the clutch to restrain wearing of the components of the clutch. The clutch includes rotatable components that rotate integrally with the rotatable shaft. The grease can be moved out of the clutch by centrifugal force of the rotatable components such that the amount of the grease in the clutch becomes insufficient. When the amount of the grease in the clutch becomes insufficient, the rotatable components in the clutch cannot be smoothly rotated, disturbing rotation of the motor.

SUMMARY OF THE INVENTION

The present invention addresses the above disadvantage, and it is an objective of the present invention to provide a motor, which includes a coupling means for coupling between a rotatable shaft of a motor main body and a worm shaft of a speed reducing unit and is capable of restraining effluence of lubricant used in the coupling means.

To achieve the objective of the present invention, there is provided a motor including a motor main body, which includes a rotatable shaft, a speed reducing unit, which is connected to the motor main body and includes a worm shaft, a coupling means for coupling between the rotatable shaft and the worm shaft, and a stopper, which restrains axial movement of at least part of the coupling means. The rotatable shaft is rotated upon energization of the motor main body. The worm shaft is rotatably supported and is substantially coaxial with the rotatable shaft. The coupling means retains lubricant. The speed reducing unit further includes at least one surrounding wall arranged radially outward of the coupling means. Each of the at least one surrounding wall has a single axial length and an end surface arranged on a motor main body side of the at least one surrounding wall, and the end surface of each of the at least one surrounding wall is engaged with the stopper. The coupling means is substantially entirely surrounded by at least one of the stopper and the at least one surrounding wall in an imaginary plane, which is substantially perpendicular to the axis of the worm shaft, to substantially restrain radially outward effluence of the lubricant.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to FIGS. 1 to 9.

Figure 1:
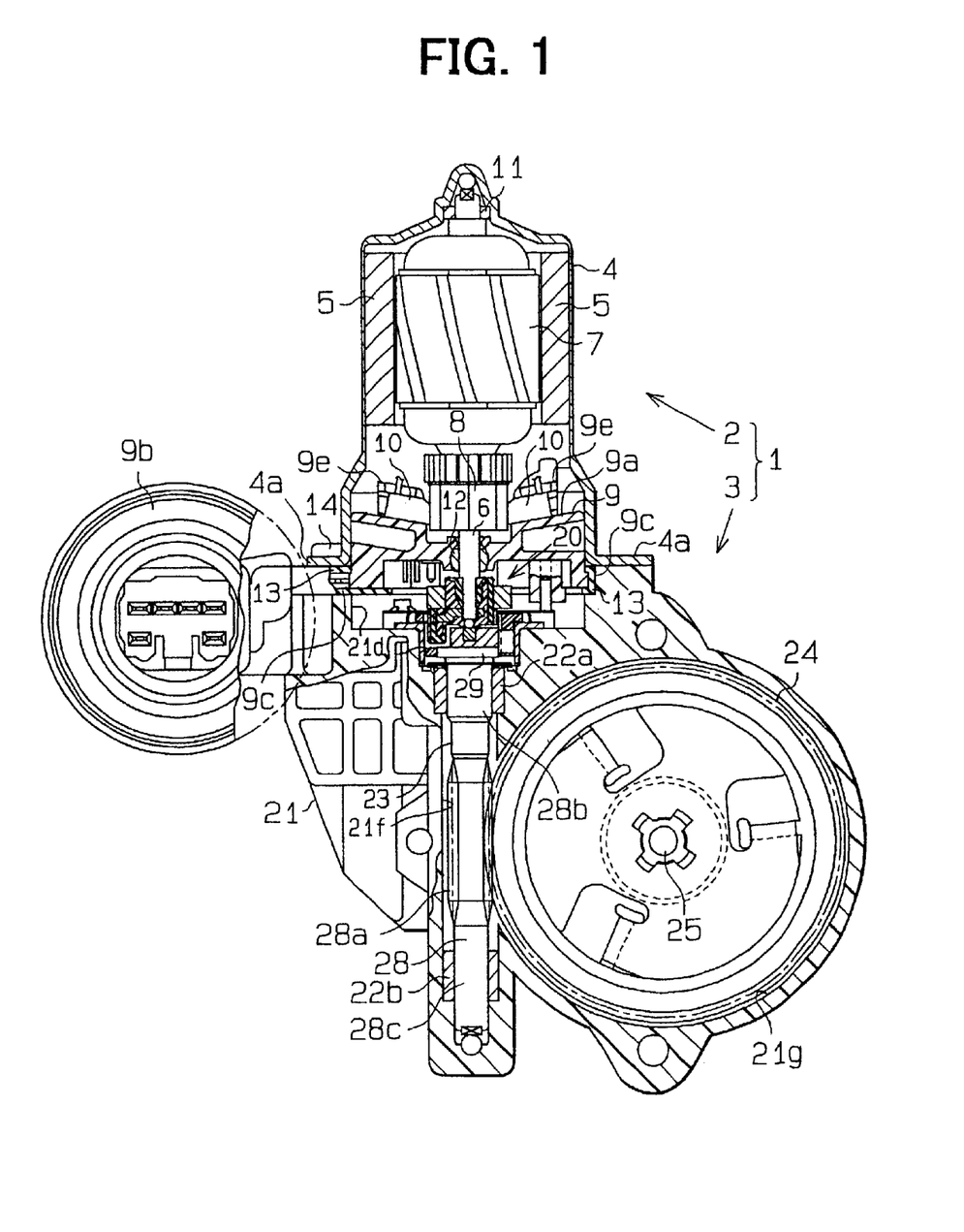
FIG. 1 is a cross sectional view of a motor according to a present embodiment.

FIG. 1 is a schematic cross sectional view of a motor 1 of the present embodiment used as a drive source for driving a power window system installed in a vehicle door. The motor 1 includes a motor main body 2, a speed reducing unit 3 and a clutch 20.

The motor main body 2 includes a yoke housing 4, a pair of magnets 5, a rotatable shaft 6, an armature 7, a commutator 8, a brush holder 9 and power supply brushes 10.

Figure 2:
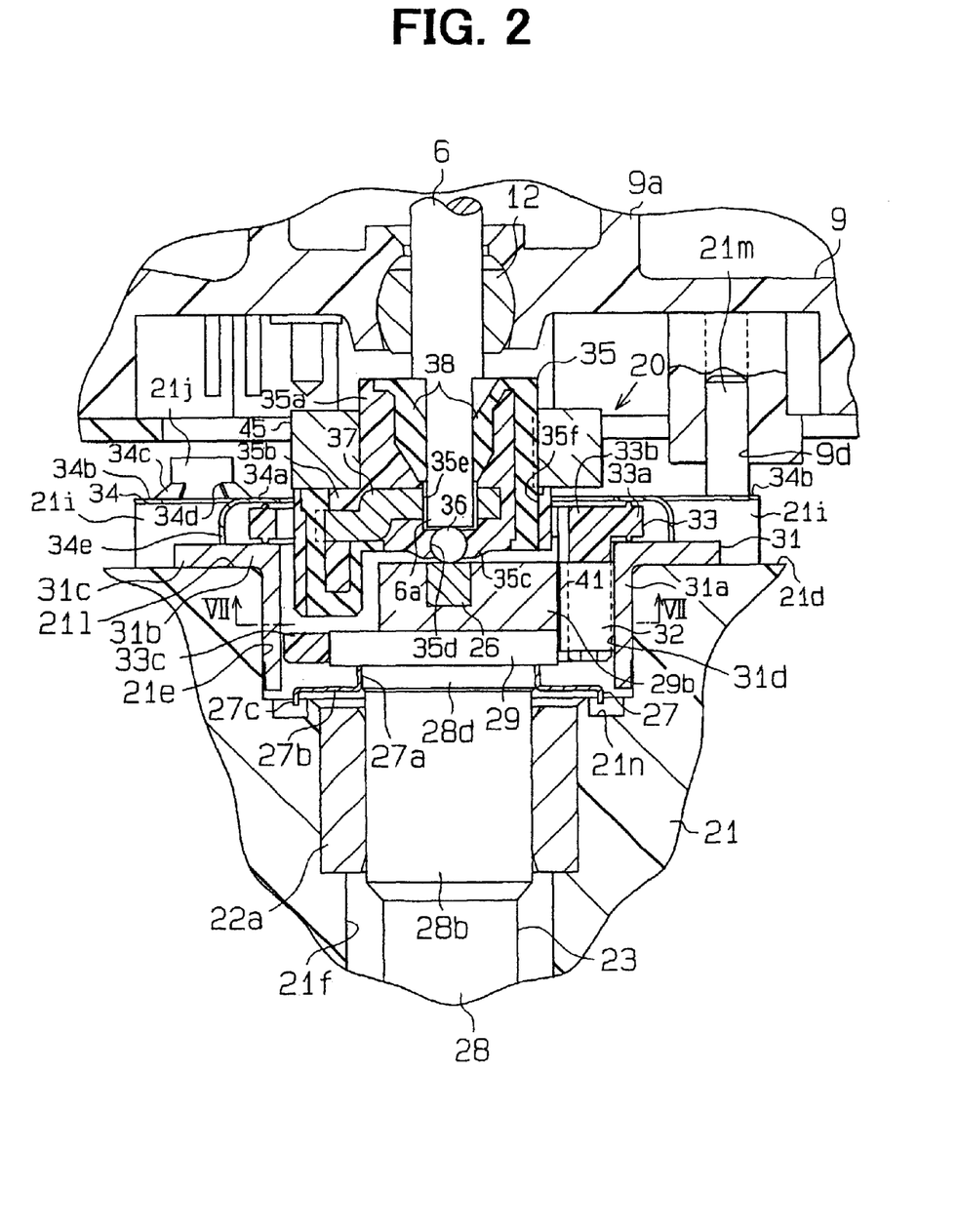
FIG. 2 is an enlarged cross sectional view showing a structure around a clutch of the motor.
Figure 3:
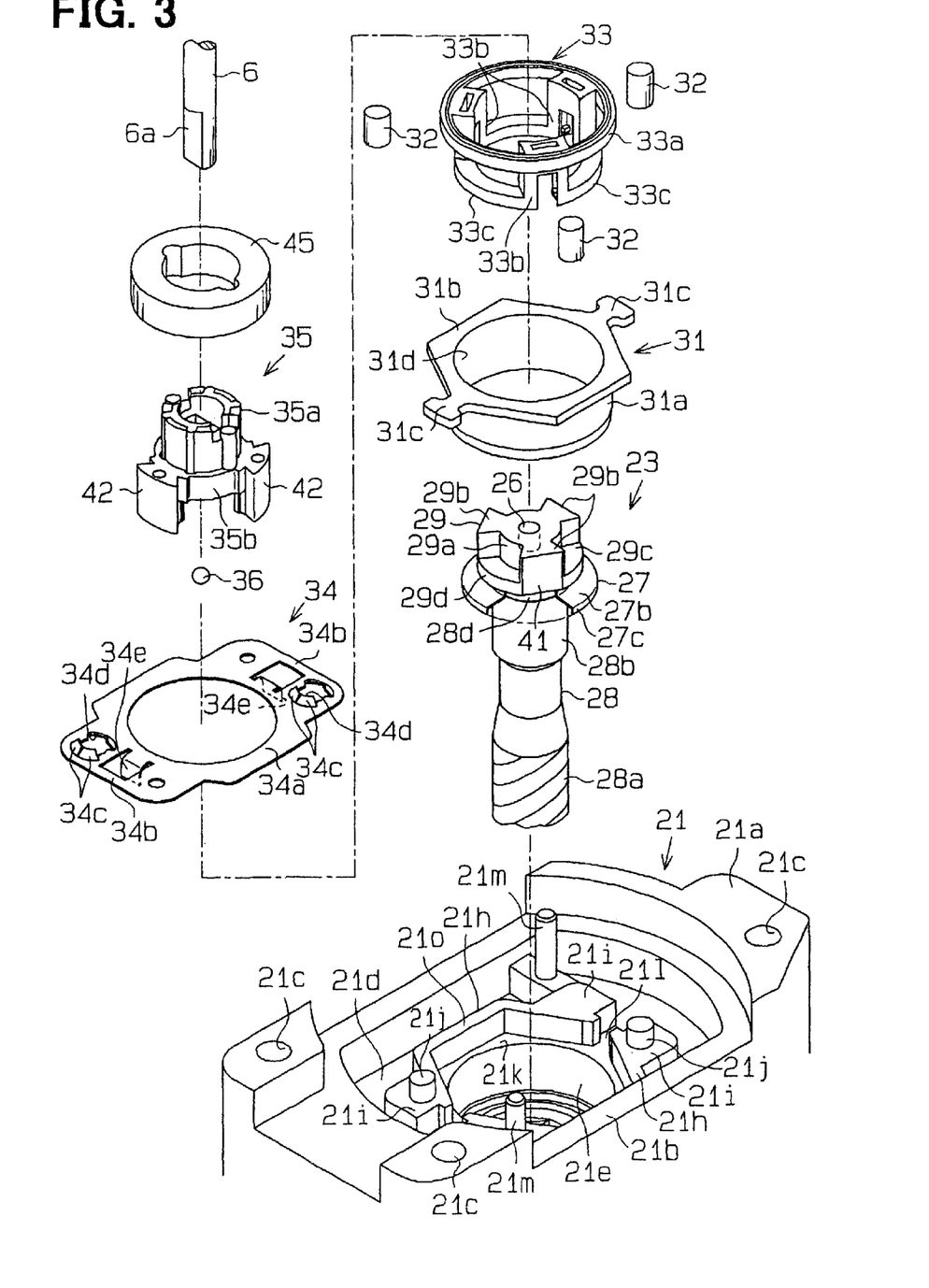
FIG. 3 is an exploded perspective view showing the clutch.

The yoke housing 4 is generally shaped as a flat cup shape. The magnets 5 are secured to an inner peripheral surface of the yoke housing 4 in opposed relationship to each other. The armature 7 is received radially inward of the magnets 5. The armature 7 includes the rotatable shaft 6. A base end of the rotatable shaft 6 is rotatably supported by a bearing 11 arranged at the center of the base of the yoke housing 4. The commutator 8 is secured to a predetermined position at a distal end side of the rotatable shaft 6. As shown in FIGS. 2 and 3, a connecting portion 6a, which has diametrically opposing flat outer wall surfaces, is formed at the distal end of the rotatable shaft 6.

The brush holder 9 is fitted in an open end of the yoke housing 4. The brush holder 9 includes a holder main body 9a and a connector 9b. The holder main body 9a has a shape that substantially covers the opening of the open end of the yoke housing 4. The connector 9b is formed integrally with the holder main body 9a and radially outwardly protrudes from the yoke housing 4.

A bearing 12 is arranged at the center of the holder main body 9a to rotatably support an intermediate portion of the rotatable shaft 6 between the commutator 8 and the connecting portion 6a. The power supply brushes 10, which are in sliding contact with the commutator 8, are connected to the connector 9b through a wiring (not shown) and are supported by brush holding portions 9e, respectively, at the yoke housing 4 side of the holder main body 9a. The power supply brushes 10 supply electric current, which is supplied from an external power source through the connector 9b, to coil windings, which are wound around the armature 7, through the commutator 8, so that the armature 7 (rotatable shaft 6), i.e., the motor main body 2 is driven to rotate.

A clamping portion 9c, which is clamped between the open end of the yoke housing 4 and an open end of a gear housing 21 (described later), is formed around an entire periphery of the holder main body 9a. The clamping portion 9c is covered with a seal member 13 made of a resilient material. The seal member 13 extends to the connector 9b. The seal member 13 is provided to seal between the open end of the yoke housing 4 and the open end of the gear housing 21. A pair of positioning holes 9d (only one is shown in FIG. 2), which extend in an axial direction of the rotatable shaft 6, is formed in the holder main body 9a at predetermined positions located inward of the clamping portion 9c.

Flange portions 4a are formed at the open end of the yoke housing 4 to secure the yoke housing 4 to the gear housing 21. Flange portions 4a have screw receiving through holes (not shown) for receiving three screws 14 (only one is shown in FIG. 1) at predetermined positions.

The speed reducing unit 3 includes the gear housing 21, bearings 22a, 22b, a worm shaft 23, a worm wheel 24 and an output shaft 25.

Figure 4:
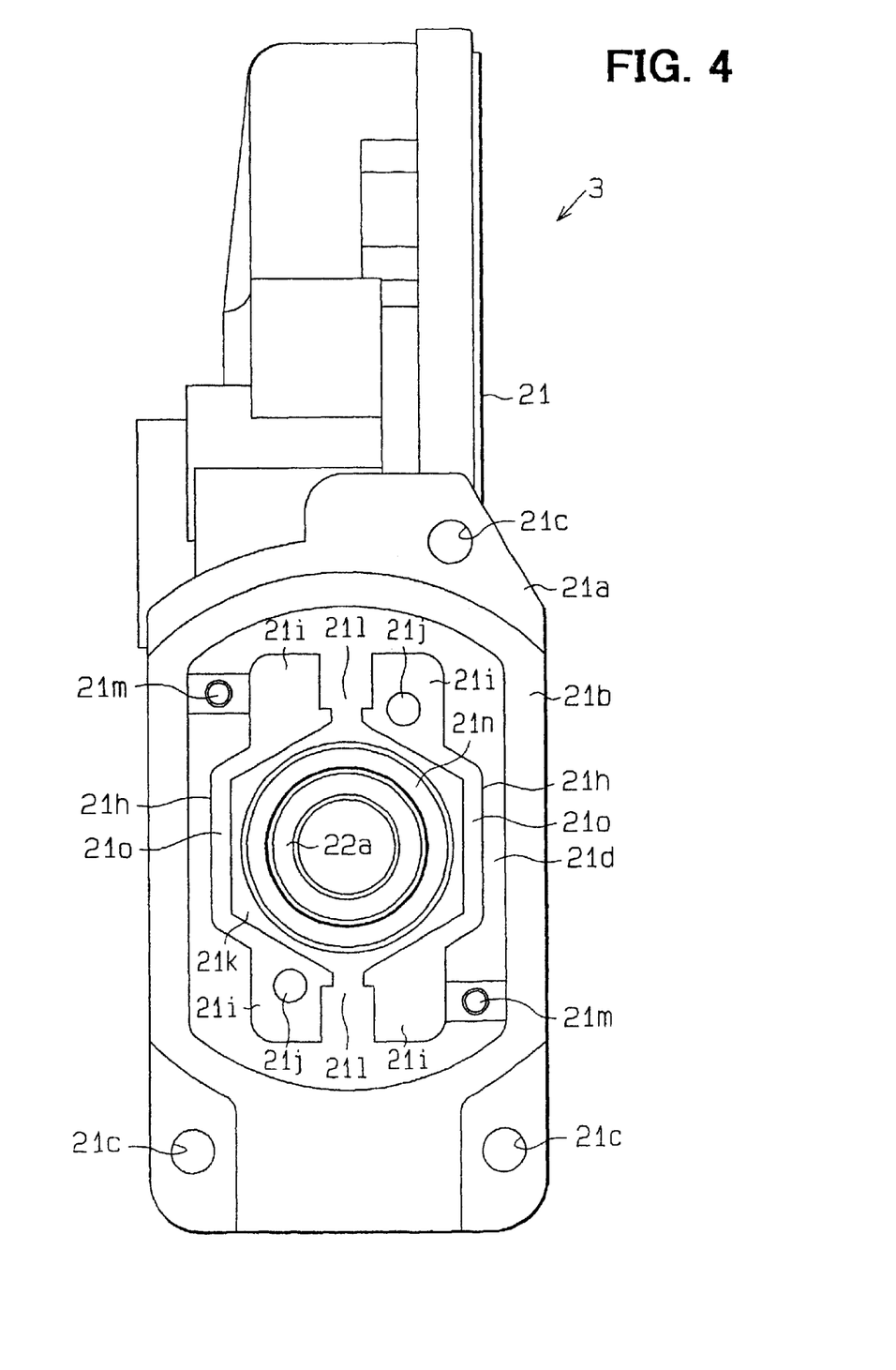
FIG. 4 is a plane view of a gear housing before assembly.

With reference to FIGS. 3 and 4, the gear housing 21 is made of a resin material and has a fitting portion 21b, to which the clamping portion 9c of the brush holder 9 is fitted, at a securing portion 21a, to which the motor main body 2 is secured. Three screw receiving holes 21c are formed in the securing portion 21a to receive the screws 14. Each screw receiving hole 21c extends to a corresponding nut installing portion, in which a nut (not shown) is installed. When the yoke housing 4 is secured to the gear housing 21, the brush holder 9 is first installed into the open end of the yoke housing 4, and then the clamping portion 9c of the holder main body 9a is fitted within the fitting portion 21b of the gear housing 21. Next, each screw 14 is inserted through the corresponding screw receiving through hole (not shown) of the corresponding flange portion 4a of the yoke housing 4 and is also inserted into the corresponding screw receiving hole 21c of the gear housing 21, such that the screw 14 is threadably engaged with the corresponding nut to secure the yoke housing 4 (motor main body 2) to the gear housing 21 (speed reducing unit 3).

A recess 21d, which has a generally ellipsoidal cross section, is arranged inward of the fitting portion 21b. A clutch receiving recess 21e, which has a circular cross section, is formed at the center of the bottom of the recess 21d. As shown in FIGS. 1 and 2, a worm shaft receiving portion 21f, which extends in the axial direction of the rotatable shaft 6, is formed in the center of the clutch receiving recess 21e. The oil impregnated bearings 22a, 22b are fitted in the worm shaft receiving portion 21f at predetermined positions. The worm shaft receiving portion 21f is communicated with a wheel receiving portion 21g.

As shown in FIGS. 3 and 4, a pair of surrounding walls 21h is arranged around the clutch receiving recess 21e at the base of the recess 21d. The surrounding walls 21h are opposed to each other in a lateral direction of the recess 21d such that the clutch receiving recess 21e is placed between the surrounding walls 21h. Each surrounding wall 21h has a single axial length. When the surrounding walls 21h are seen in the axial direction of the motor 1, the surrounding walls 21h substantially entirely surround the clutch receiving recess 21e such that the surrounding walls 21h define a regular hexagonal shape therein. The surrounding walls 21h substantially entirely surround a ring 33a of a support member 33, which is a rotatable component of the clutch 20 described below.

Grease (not shown) is applied to predetermined portions of the clutch 20 (such as surfaces between each support 33b of the support member 33 and a corresponding rolling element 32, surfaces between each rolling element 32 and an inner peripheral surface 31d of a collar 31, surfaces between the ring 33a of the support member 33 and a flange 31b of the collar 31). When the support member 33 rotates, the applied grease tries to move radially outward beyond the ring 33a of the support member 33 due to the centrifugal force generated by the rotation of the support member 33. However, the surrounding walls 21h, which surround the ring 33a, restrain effluence of the grease beyond the surrounding walls 21h. That is, the surrounding walls 21h restrain the effluence of the grease in the clutch 20, so that depletion of the grease in the clutch 20 is restrained.

A generally rectangular base 21i is provided at each of opposed ends of each surrounding wall 21h to extend in a longitudinal direction of the recess 21d. That is, the four bases 21i are provided, and each base 21i has a height (axial length) that is substantially the same as that of the corresponding surrounding wall 21h. A cylindrical engaging protrusion 21j is provided in each of the two diagonally opposed bases 21i.

A flange engaging recess (serving as a second side engaging portion) 21k is formed radially inward of the surrounding walls 21h around the clutch receiving portion 21e. The flange engaging recess 21k has a hexagonal outer periphery. A projection engaging recess (serving as a second side engaging portion) 21l is defined at each of longitudinal ends of the flange engaging recess 21k such that each projection engaging recess 21l extends in the longitudinal direction of the flange engaging recess 21k between the opposed surrounding walls 21h (between the opposed bases 21i). A pair of positioning projections 21m is provided adjacent to the corresponding bases 21i at the base of the recess 21d. Each positioning projection 21m is fitted into the corresponding positioning hole 9d arranged in the brush holder 9 to position the brush holder 9 relative to the gear housing 21.

The worm shaft 23 includes a worm shaft portion 28 and a driven-side rotator 29. The driven-side rotator 29 is integrally formed at a base end side (on the motor main body 2 side) of the worm shaft portion 28. A contact member 26 is inserted in a motor main body 2 side end surface of the worm shaft 23 at a position where a ball 36 (described below) contacts the worm shaft 23. The contact member 26 makes a point contact with the ball 36. Thus, the contact member 26 is made of a metal material (hardened metal material) having rigidity higher than the rest of the worm shaft 23 to restrain excessive wearing of the contact portion of the contact member 26, which contacts the ball 36.

A worm 28a is formed at an intermediate section of the worm shaft portion 28. Contact portions 28b, 28c for making sliding contact are formed at opposed ends of the worm shaft portion 28. The distal end side contact portion 28c of the worm shaft portion 28 has an outer diameter smaller than that of the base end side contact portion 28b. The worm shaft portion 28 is rotatably supported by the bearings 22a, 22b at the contact portions 28b, 28c and is received coaxially with the rotatable shaft 6 in the worm shaft receiving portion 21f. The worm shaft 23 has an installation portion 28d, which is placed between the driven-side rotator 29 and the base end side contact portion 28b and has an outer diameter greater than that of the base end side contact portion 28b.

As shown in FIGS. 2 and 3, a generally disk shaped plate cup 27 is installed to the installation portion 28d. The plate cup 27 includes a cylindrical securing portion 27a, an annular disk portion 27b and an annular protrusion 27c. The securing portion 27a is press fitted around the installation portion 28d. The disk portion 27b extends radially outwardly from the securing portion 27a. The annular protrusion 27c has an annular form and cylindrically protrudes from an outer peripheral edge of the disk portion 27b on a side opposite to the securing portion 27a. Here, an annular recess 21n is formed around the worm shaft receiving recess 21f at the base of the clutch receiving recess 21e. A distal end of the annular protrusion 27c of the plate cup 27 is received in the annular recess 21n. The plate cup 27 is provided to separate the space (worm shaft receiving portion 21f) that receives the bearing 22a from the space (clutch receiving recess 21e) that receives the clutch 20.

The lubricant oil is impregnated in the oil impregnated bearing 22a, and the grease is applied to the clutch 20. The lubricant oil used in the bearing 22a has relatively low viscosity. Thus, if the plate cup 27 is not used, the lubricant oil, which is used in the bearing 22a, is spattered onto the clutch 20 side, so that the lubricant oil and the grease of the clutch 20 are mixed together, causing deterioration of the quality of the grease. If this happens, durability of the clutch 20 is reduced. To prevent this, the plate cup 27 separates the space (worm shaft receiving portion 21f) that receives the bearing 22a from the space (clutch receiving recess 21e) that receives the clutch 20 to restrain mixing of the lubricants. The distal end of the annular protrusion 27c of the plate cup 27 is inserted into the annular recess 21n of the gear housing 21, so that a portion that connects between the above two spaces forms a maze that can effectively separate the above two spaces from each other.

As described above, the installation portion 28d of the worm shaft 23 has the outer diameter larger than that of any of the contact portions 28b, 28c, so that an inner diameter of the securing portion 27a of the plate cup 27, which is press fitted around the installation portion 28d, is larger than the outer diameter of any of the contact portions 28b, 28c. That is, the plate cup 27 is moved along the worm shaft 23 toward the installation portion 28d from the distal end of the worm shaft 23. At that time, the securing portion 27a of the plate cup 27 is less likely to contact with the contact portions 28b, 28c. This is due to the following reason. That is, an outer peripheral surface of each contact portion 28b, 28c is highly polished to achieve smooth sliding contact with the corresponding bearing 22a, 22b, so that contact of the plate cup 27 with the outer peripheral surfaces of the contact portions 28b, 28c during installation of the plate cup 27 to the worm shaft 23 should be restrained to restrain scratches or damages to the outer peripheral surfaces of the contact portions 28b, 28c caused by contact of the plate cup 27 to them.

The worm wheel 24 is meshed with the worm shaft 23 (worm 28a) and is received within the wheel receiving portion 21g in such a manner that the worm wheel 24 is allowed to rotate about its rotational axial, which extends in a direction perpendicular to the worm shaft 23. The output shaft 25 is connected to the worm wheel 24 in such a manner that the output shaft 25 integrally rotates with the worm wheel 24. The output shaft 25 is drivingly connected to a known window regulator (not shown) for raising and lowering a window glass.

The clutch 20 is placed between the rotatable shaft 6 and the worm shaft 23 and drivingly couples between the rotatable shaft 6 and the worm shaft 23. The clutch 20 transmits rotational force of the rotatable shaft 6 generated upon operation, or energization, of the motor main body 2 to the worm shaft 23. However, the clutch 20 restrains rotation of the worm shaft 23 to restrain transmission of rotational force of the worm shaft 23 to the rotatable shaft 6 when rotational force is applied to the worm shaft 23 from a load (window regulator) side through the output shaft 25 and the worm wheel 24.

With reference to FIGS. 2 and 3, the clutch 20 includes the driven-side rotator 29 integrated with the worm shaft 23, the collar 31, the three rolling elements 32, the support member 33, a driving-side rotator 35 and the ball 36.

The collar 31 includes a cylindrical main body 31a, the flange (serving as a first side engaging portion) 31b and a pair of engaging projections (serving as first side engaging portions) 31c. The flange 31b extends radially outward from one end (upper end in FIGS. 2 and 3) of the cylindrical main body 31a and has a regular hexagonal outer peripheral shape. The engaging projections 31c extend radially outward from two opposed corners, respectively, of the flange 31b.

The collar 31 is made from a metal plate material through press-working. The flange 31b and the engaging projections 31c are formed in the following manner. That is, an annular flange segment is first formed by bending a corresponding portion with respect to the cylindrical main body 31a. Then, the four corners and the two engaging projections 31c are drawn radially outward through press-working of the annular flange segment. Thus, when the flange 31b and the engaging projections 31c are formed by the drawing, substantially equal tensile stress is radially outwardly applied to each of six points, which are arranged at equal intervals. If the flange 31b has an annular shape, tensile stress is radially outwardly applied to each of two diametrically opposed points of the flange 31b during formation of the engaging projections 31c. This may cause deformation of the cylindrical main body 31a into a slightly ellipsoidal shape. In such a case, such deformation will impose relatively large adverse influence on the operation of the clutch 20, so that reliability of the clutch 20 is deteriorated. Thus, the use of the annular flange is not preferred. Contrary to this, according to the present embodiment, the flange 31b has a regular hexagon shape. Thus, during the drawing, substantially equal tensile stress is radially outwardly applied to each of six points of the cylindrical main body 31a, which are arranged at equal intervals along a circumferential direction of the cylindrical main body 31a. As a result, deformation of the cylindrical main body 31a is minimized to achieve a relatively high roundness of the cylindrical main body 31a. In this way, reliability of the clutch 20 is improved.

The cylindrical main body 31a of the collar 31 is fitted in the clutch receiving recess 21e, and the flange 31b is fitted in the flange engaging recess 21k. Furthermore, the engaging projections 31c are fitted in the projection engaging recesses 21l. Thus, the collar 31 is installed in the recess 21d of the gear housing 21 while rotation of the collar 31 is prevented. In a case where the collar 31 is automatically installed to the gear housing 21 by an assembling machine, the engaging projections 31c will be gripped by the assembling machine.

Figure 7:
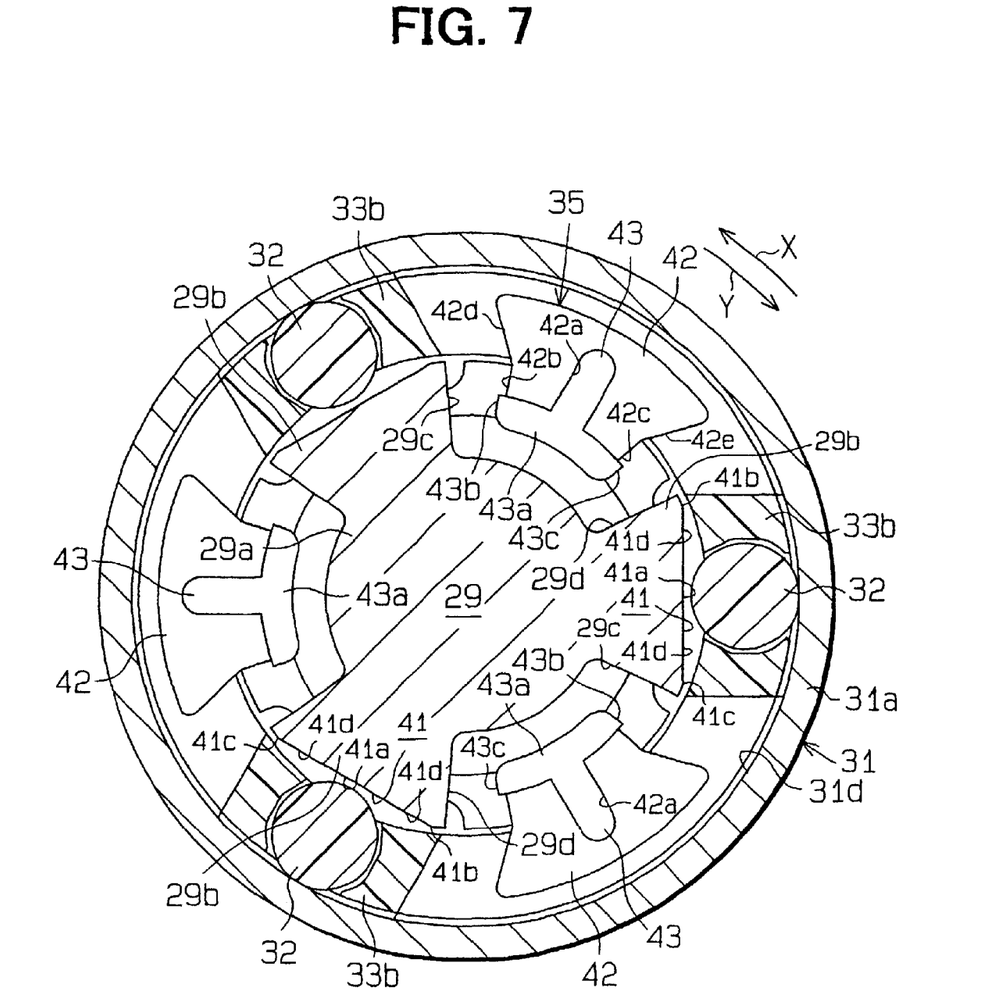
FIG. 7 is a cross sectional view along line VII—VII in FIG. 2 showing one operational state of the clutch.

The driven-side rotator 29 is arranged radially inward of the cylindrical main body 31a of the collar 31. With reference to FIG. 3, the driven-side rotator 29 includes a shaft portion 29a and three engaging projections 29b. The shaft portion 29a extends from the base end of the worm shaft portion 28 toward the motor main body 2. The engaging projections 29b extend radially outwardly from the shaft portion 29a and are arranged at substantially equal angular intervals (120 degree intervals). Each engaging projection 29b has a progressively increasing circumferential width that increases toward a radially outer end thereof. As shown in FIG. 7, a radially outer surface of each engaging projection 29b constitutes a control surface 41. Each control surface 41 is spaced from an inner peripheral surface 31d of the cylindrical main body 31a of the collar 31, and this space varies in a rotational direction. Each control surface 41 is a flat surface that is spaced from the inner peripheral surface 31d of the collar 31, and this space decreases toward each circumferential end of the control surface 41.

Each rolling element 32 is made of a resin material and is shaped into a generally cylindrical shape. Furthermore, as shown in FIGS. 2 and 7, each rolling element 32 is arranged between the control surface 41 of the corresponding engaging projection 29b and the inner peripheral surface 31d of the collar 31. An outer diameter of the rolling element 32 is smaller than a distance between a center portion (center in the rotational direction) 41a of the control surface 41 and the inner peripheral surface 31d of the collar 31 but is longer than a distance between each of circumferential end portions (ends in the rotational direction) 41b, 41c of the control surface 41 and the inner peripheral surface 31d of the collar 31. That is, the outer diameter of the rolling element 32 is equal to a distance between the inner peripheral surface 31d of the collar 31 and each intermediate portion 41d located between the center portion 41a and each circumferential end portion 41b or 41c.

As shown in FIGS. 2 and 3, the support member 33 includes the ring 33a, the supports 33b and connectors 33c. The ring 33a is shaped as an annular body that has an outer diameter larger than that of the cylindrical main body 31a of the collar 31. The ring 33a is placed on the top surface of the flange 31b of the collar 31. Each of the supports 33b extends in a direction parallel to the axial direction at radially inward of the ring 33a. The supports 33b rotatably support the rolling elements 32 in place at equal angular intervals (120 degree intervals). The supports 33b are placed between the collar 31 and the driven-side rotator 29 such that each rolling element 32 is arranged between the inner peripheral surface 31d of the collar 31 and the corresponding control surface 41 of the driven-side rotator 29. Each connector 33c is arcuate and is placed between the collar 31 and the driven-side rotator 29. Each connector 33c connects between ends (opposite to the ring 33a) of the corresponding two supports 33b to maintain a space between the supports 33b.

Figure 5:
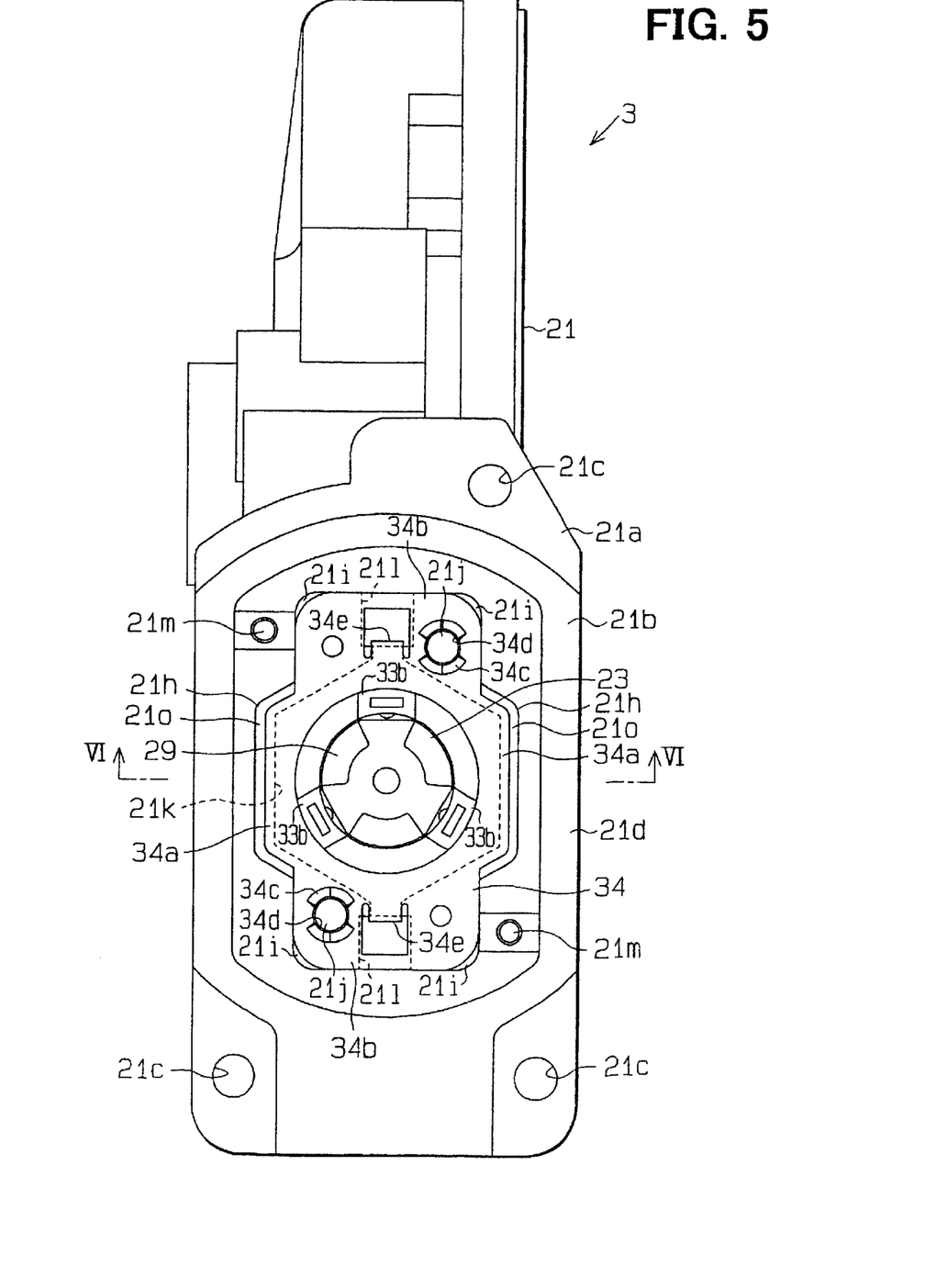
FIG. 5 is a plane view of a gear housing after the assembly.
Figure 6:
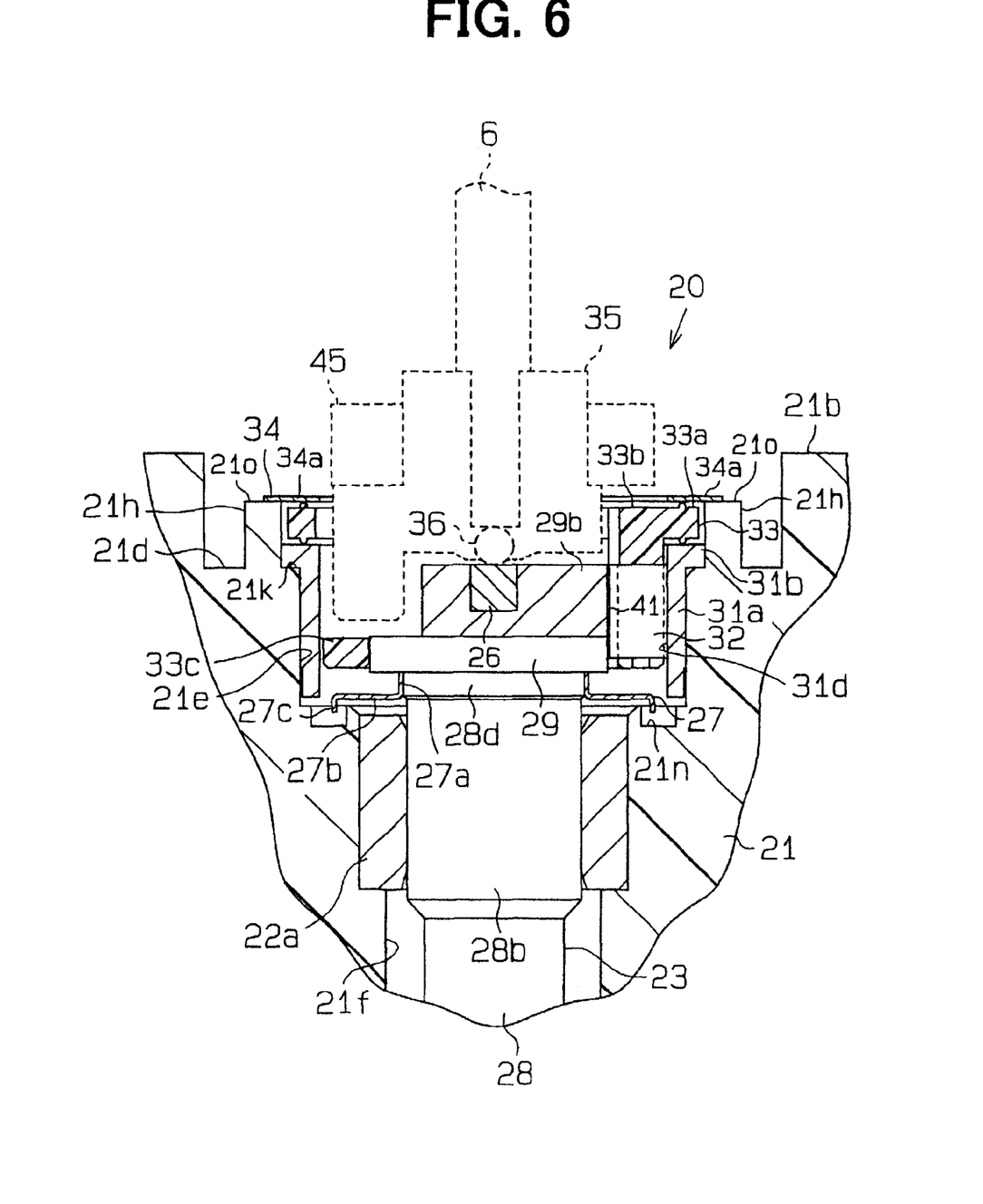
FIG. 6 is a cross sectional view along line VI—VI in FIG. 5.

As shown in FIGS. 3 and 5, a stopper 34 is provided in the gear housing 21. The stopper 34 includes an annular portion 34a and securing portions 34b. The annular portion 34a has a circular inner peripheral part that defines a central through hole for receiving the driving-side rotator 35. The annular portion 34a also has an outer peripheral part that engages the top surfaces 21o of the surrounding walls 21h along substantially an entire periphery of the annular portion 34a. As shown in FIG. 6, an inner circumferential edge of the annular portion 34a is positioned radially inward of the surrounding walls 21h, and the annular portion 34a is arranged to cover the top surface of the ring 33a of the support member 33 along its entire periphery to restrain axial movement of the support member 33. Furthermore, an inner circumferential edge of the annular portion 34a is positioned radially inward of the surrounding walls 21h. In FIG. 6, each corresponding rotatable component of the clutch 20 is rotated to a corresponding position that allows visualization of the rotatable component in a view similar to that of FIG. 2.

As described above, the surrounding walls 21h of the gear housing 21 restrain radially outward movement of the grease in the clutch 20, so that the grease is retained radially inward of the surrounding walls 21h. The retained grease tries to flow out from the top parts of the surrounding walls 21h. However, the annular portion 34a of the stopper 34, which has the above described shape, closes an opening between the surrounding walls 21h and the driving-side rotator 35, so that the further upward movement of the grease beyond the annular portion 34a is restrained by the annular portion 34a. Thus, the annular portion 34a of the stopper 34 cooperates with the surrounding walls 21h to more effectively restrain the effluence of the grease from the inside of the clutch 20.

Each securing portion 34b has a generally rectangular shape and extends radially outward from the annular portion 34a. Furthermore, each securing portion 34b is placed on the top surfaces of the corresponding bases 21i. Each securing portion 34b has a securing hole 34d at a position that coincides with the position of the corresponding engaging protrusion 21j of the gear housing 21. The securing hole 34d of each securing portion 34b has four engaging pieces 34c, which protrude inwardly. When each corresponding engaging protrusion 21j of the gear housing 21 is inserted in the corresponding securing hole 34d of the stopper 34 and is engaged with the engaging pieces 34c of the corresponding securing hole 34d, the stopper 34 is secured to the gear housing 21.

A limiting portion 34e is formed in the center of each securing portion 34b. The limiting portion 34e is formed by cutting a corresponding portion of the securing portion 34b and bending it downward. Each limiting portion 34e is inserted in the corresponding projection engaging recess 21l defined between the opposed bases 21i, so that a distal end of the limiting portion 34e restrain axial movement of the collar 31 by abutting against a top surface of the corresponding engaging projection 31c, as shown in FIG. 2. Furthermore, when each limiting portion 34e is inserted in the corresponding projection engaging recess 21l, the limiting portion 34e substantially closes the projection engaging recess 21l. That is, the surrounding walls 21h and the limiting portions 34e of the stopper 34 cooperate together to substantially entirely surround the clutch 20 in an imaginary plane, which is substantially perpendicular to the axis of the worm shaft 23. Thus, even when the grease in the clutch 20 tries to move outwardly from the projection engaging recess 21l, each limiting portion 34e restrains further movement of the grease beyond the limiting portion 34e.

As sown in FIGS. 2 and 3, the driving-side rotator 35 includes a shaft portion 35a, a disk portion 35b and a ball holding portion 35c. The disk portion 35b has an outer diameter larger than that of the shaft portion 35a. The ball holding portion 35c is formed in the center of the disk portion 35b. An annular sensor magnet 45, which has a plurality of poles arranged in a circumferential direction, is secured around the shaft portion 35a to integrally rotate with the shaft portion 35a. A magnetic sensing element (not shown), such as a Hall element or a magneto-resistive element, is provided in the brush holder 9 near the sensor magnet 45. The magnetic sensing element measures a change in magnetic field during rotation of the sensor magnet 45 to measure a rotational speed of the rotatable shaft 6, which rotates together with the driving-side rotator 35.

A ball receiving recess 35d for holding the ball 36 is formed in the ball holding portion 35c. The ball 36 is held in the ball receiving recess 35d in such a manner that the ball 36 partially protrudes from the ball receiving recess 35d in both axial directions and is engaged with an end surface of the rotatable shaft 6 at one axial end and with the end surface of the worm shaft 23 (contact member 26) at the opposite axial end. Similar to the contact member 26, the ball 36 is made of a hardened metal material to achieve the higher rigidity.

A connecting hole 35e axially extends along the axial center of the driving-side rotator 35 from a base end (top end in FIG. 2) of the shaft portion 35a toward the ball holding portion 35c and is communicated with the ball receiving recess 35d. The connecting hole 35e acts as a connecting portion and has two diametrically opposing flat inner wall surfaces. The connecting portion 6a of the rotatable shaft 6 is loosely fitted within the connecting hole 35e. The driving-side rotator 35 is drivingly connected to the rotatable shaft 6 to rotate together by loosely fitting the connecting portion 6a of the rotatable shaft 6 within the connection hole 35e. Even when an axial deviation occurs between the connecting hole 35e and the rotatable shaft 6, the axial deviation can be allowed by loosely fitting the connecting portion 6a of the rotatable shaft 6 within the connection hole 35e.

A metal plate 37, which has a predetermined shape, is inserted within the driving-side rotator 35 to increase the rigidity of the driving-side rotator 35. Furthermore, a resilient holding portion 38, which is made of an elastomer resin material, is integrally molded to the driving-side rotator 35, such that the resilient holding portion 38 extends from the connection hole 35e. The resilient holding portion 38 clamps the connecting portion 6a of the rotatable shaft 6 by the resilient force of resilient holding portion 38. Thus, during the assembly of the motor 1, the driving-side rotator 35 is installed to the rotatable shaft 6. At that time, the driving-side rotator 35 is installed to the rotatable shaft 6 such that the resilient holding portion 38 resiliently clamps or holds the connecting portion 6a of the rotatable shaft 6, so that the driving-side rotator 35 does not fall off from the rotatable shaft 6.

As shown in FIG. 3, three generally fan-shaped protrusions 42, which extend radially outward and also extend in the axial direction, are arranged at substantially equal angular intervals (120 degree intervals) on the distal end side (lower side in FIG. 2) of the disk portion 35b of the driving-side rotator 35. As shown in FIG. 7, each protrusion 42 is formed such that the protrusion 42 can be inserted in the cylindrical main body 31a of the collar 31 through the central through hole of the annular portion 34a of the stopper 34. Each protrusion 42 is circumferentially arranged between the adjacent engaging projections 29b of the driven-side rotator 29 and also between the adjacent rolling elements 32 (supports 33b of the support member 33) within the cylindrical main body 31a.

In each protrusion 42, a coupling groove 42a extends halfway from an inner peripheral surface of the protrusion 42 in a radially outward direction. A cushion member 43, which is made of an elastomer material, is integrally molded to the coupling groove 42a. The cushion members 43 are connected to the resilient holding portion 38 via through holes 35f (FIG. 2) formed at predetermined positions in the driving-side rotator 35, and the cushion members 43 are simultaneously made together with the resilient holding portion 38. A cushion segment 43a is formed in the cushion member 43. Each cushion segment 43a extends radially inwardly from the coupling groove 42a of the corresponding protrusion 42 and also extends in the circumferential direction. Circumferential ends 43b, 43c of each cushion segment 43a protrude from engaging surfaces 42b, 42c of the corresponding protrusion 42, which are formed at a radially inward section of the protrusion 42.

When the driving-side rotator 35 is rotated in counter-clockwise direction (direction of an arrow X), the counter-clockwise side engaging surface 42b of each protrusion 42 is engaged with a clockwise side lateral surface 29c of the corresponding engaging projection 29b, so that the driving-side rotator 35 and the driven-side rotator 29 are engaged in the rotational direction. At that time, the counter-clockwise side end 43b of the cushion segment 43a is compressed by the lateral surface 29c of the engaging projection 29b to reduce collision shocks between the engaging surface 42b of the protrusion 42 and the lateral surface 29c of the engaging projection 42b before the engaging surface 42b of the protrusion 42 engages the lateral surface 29c of the engaging projection 29b.

On the other hand, when the driving-side rotator 35 rotates in the clockwise direction (direction of an arrow Y) relative to the driven-side rotator 29, the clockwise side engaging surface 42c of the protrusion 42 engages a counter-clockwise side lateral surface 29d of the engaging projection 29b, so that the driving-side rotator 35 and the driven-side rotator 29 are engaged in the counter-clockwise direction. At this time, similar to the above case, the clockwise side end 43c of the cushion segment 43a is compressed by the lateral surface 29d of the engaging projection 29b to reduce collision shocks between the engaging surface 42c of the protrusion 42 and the lateral surface 29c of the engaging projection 29b before the engaging surface 42c of the protrusion 42 engages the lateral surface 29d of the engaging projection 29b.

Figure 8:
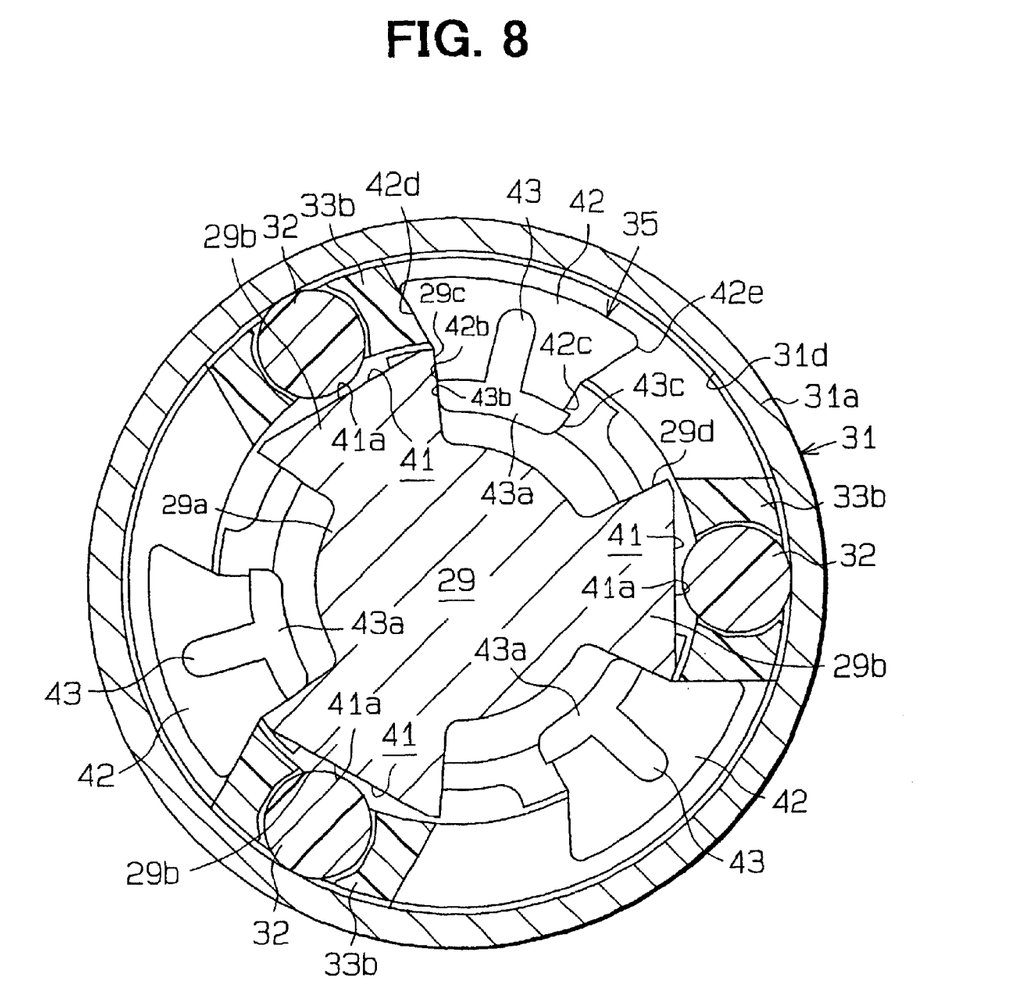
FIG. 8 is a cross sectional view similar to FIG. 7 showing another operational state of the clutch.

With reference to FIG. 8, a shape and a size of each component 32, 42, 29b, 33b are chosen in the following manner. That is, each rolling element 32 is placed at the center portion 41a of the corresponding control surface 41 when the counter-clockwise side engaging surface 42b of the corresponding protrusion 42 engages the lateral surface 29c of the engaging projection 29b, and an urging surface 42d formed at the radially outward region of the counter-clockwise side surface of the protrusion 42 engages the corresponding support 33b of the support member 33. Also, each rolling element 32 is placed at the center portion 41a of the corresponding control surface 41 when the clockwise side engaging surface 42c of the corresponding protrusion 42 engages the lateral surface 29d of the engaging projection 29b, and an urging surface 42e formed at the radially outward region of the clockwise side surface of the protrusion 42 engages the corresponding support 33b of the support member 33.

In the thus constructed clutch 20, when the motor main body 2 is driven to rotate the rotatable shaft 6, for example, in the counter-clockwise direction (direction of the arrow X) in FIG. 7, the driving-side rotator 35 rotates together with the rotatable shaft 6 in the counter-clockwise direction.

Then, as shown in FIG. 8, when the engaging surface 42b of each protrusion 42 of the driving-side rotator 35 engages the lateral surface 29c of the corresponding engaging projection 29b of the driven-side rotator 29, the driving-side rotator 35 and the driven-side rotator 29 are engaged in the counter-clockwise direction. At this time, the urging surface 42d of each protrusion 42 urges the corresponding support 33b of the support member 33 to place the corresponding rolling element 32 at a neutral position at the center portion 41a of the control surface 41.

In the neutral position, the rolling element 32 is not clamped between the control surface 41 of the corresponding engaging projection 29b and the inner peripheral surface 31d of the collar 31, so that the driven-side rotator 29 can rotate. Thus, when the driving-side rotator 35 is further rotated in the counter-clockwise direction, the rotational force of the driving-side rotator 35 is transmitted from each protrusion 42 to the driven-side rotator 29, so that the driven-side rotator 29 is rotated in the counter-clockwise direction. Although not shown, when the rotatable shaft 6 is rotated in the clockwise direction (direction of the arrow Y) in FIG. 7, the driving-side rotator 35 is rotated together with the rotatable shaft 6 in the clockwise direction, and the driven-side rotator 29 is also rotated in the clockwise direction in a manner similar to that described above.

When the rotational force is transmitted from the rotatable shaft 6 (driving-side rotator 35) to the worm shaft 23 (driven-side rotator 29) through the clutch 20, the worm wheel 24 and the output shaft 25 are rotated accordingly. Then, the window regulator is operated based on the rotation of the output shaft 25 to open or close (raise or lower) the window glass.

Figure 9:
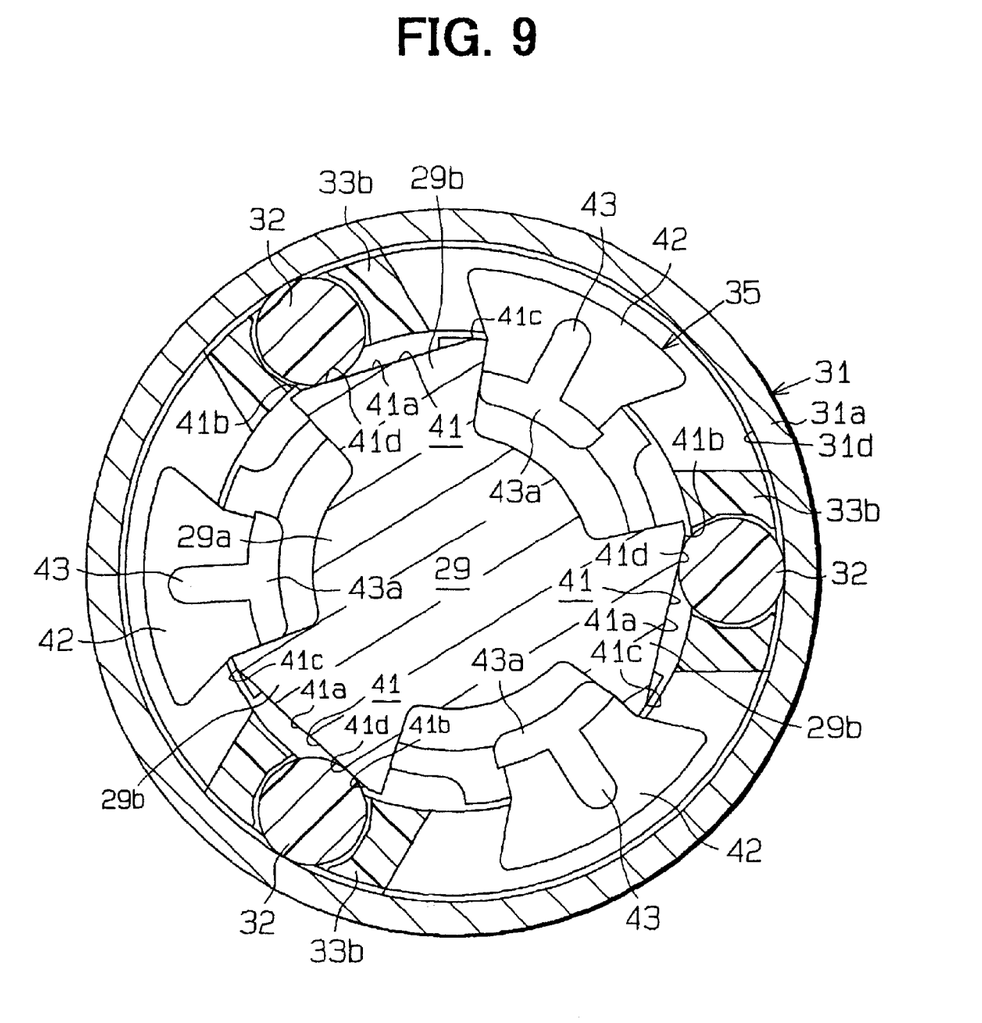
FIG. 9 is a cross sectional view similar to FIGS. 7 and 8 showing another operational state of the clutch.

When the motor 1 is stopped, and rotational force is applied to the output shaft 25 from the load (window glass) side, the worm shaft 23 (driven-side rotator 29) is slightly rotated. At that time, when the driven-side rotator 29 is rotated, for example, in the clockwise direction (direction of the arrow Y) in FIG. 7, and each rolling element 32 is placed to the position where the rolling element 32 is clamped between the intermediate portion 41d of the corresponding control surface 41 and the inner peripheral surface 31d of the collar 31, as shown in FIG. 9, further rotation of the driven-side rotator 29 (worm shaft 23) in the clockwise direction is restrained (placed in the locked position). Although not shown, when the driven-side rotator 29 is rotated in the counter-clockwise direction (direction of the arrow X) in FIG. 7, each rolling element 32 is placed to the position where the rolling element 32 is clamped between the intermediate portion 41d of the corresponding control surface 41 and the inner peripheral surface 31d of the collar 31, so that further rotation of the driven-side rotator 29 (worm shaft 23) in the counter-clockwise direction is restrained.

As a result, even when downward load is applied to the window glass by its weight or by vibrations of the running vehicle, and thus rotational force is applied to the output shaft 25, rotation of the worm shaft 23 is restrained by the clutch 20 to restrain rotation of the output shaft 25, so that downward movement of the window glass during the non-operating state of the motor 1 is restrained.

As described above, the present embodiment provides the following advantages.

(1) The rotatable shaft 6 of the motor main body 2 and the worm shaft 23 of the speed reducing unit 3 are drivingly coupled by the clutch 20. The surrounding walls 21h are formed integrally with the gear housing 21 such that the surrounding walls 21h substantially entirely surround the clutch 20 at radially outward of the clutch 20. Thus, the surrounding walls 21h restrain outward movement of the lubricant (grease) applied to the predetermined portions of the clutch 20, so that effluence of the lubricant (grease) from the clutch 20 can be restrained. As a result, the clutch can be properly operated for a long period, and durability of the clutch 20 (motor 1) can be improved.

(2) The surrounding walls 21h are formed integrally with the gear housing 21, so that the surrounding walls 21h can be easily provided. Furthermore, the number of the components is not increased.

(3) The clutch 20 includes the collar 31, which is non-rotatably arranged to act as a main restraining point for restraining rotation of the worm shaft 23 when rotational force is applied to the worm shaft 23 from the load side, and the collar 31 includes the flange 31b and the engaging projections 31c, which restrain rotation of the collar 31. Furthermore, the flange engaging recess 21k and the projection engaging recesses 21l, which are engaged with the flange 31b and the engaging projections 31c, respectively, are formed with the surrounding walls 21h. Thus, a space for arranging the flange engaging recess 21k and the projection engaging recesses 21l can be minimized, so that a reduction in the space in the gear housing 21 (motor 1) can be achieved, allowing a reduction in a size of the gear housing 21 (motor 1).

(4) The plate shaped stopper 34 restrains axial movement of the support member 33 of the clutch 20. The stopper 34 engages each top surface 21o, which is the axial end surface of each surrounding wall 21h, and the stopper 34 includes the annular portion 34a, which closes the axial opening of the surrounding walls 21. Thus, the annular portion 34a can retrain effluence of the lubricant (grease) from the axial opening of the surrounding walls 21h, so that the effluence of the lubricant (grease) from the clutch 20 can be more effectively restrained.

The above embodiment can be modified in the following manner.

In the above embodiment, when the surrounding walls 21 are seen in the axial direction, the surrounding walls 21 are arranged to inwardly define the generally regular hexagon. The defined shape is not limited to the generally regular hexagon and can be modified to, for example, any other polygonal shape, such as a rectangular shape, or a circular shape. In such a case, the shape of the annular portion 34a of the stopper 34 and the shape of the flange 31b are modified to correspond with the modified shape defined by the surrounding walls 21h. Furthermore, although the surrounding walls 21h are formed integrally with the gear housing 21, the surrounding walls 21h can be provided separately from the gear housing 21. For example, the surrounding walls 21h can be provided in the brush holder 9. Furthermore, the two surrounding walls 21h can be replaced with a single continuous surrounding wall that entirely completely surround the clutch in an imaginary plane, which is perpendicular to the axis of the worm shaft 23. In such a case, the projection engaging recesses 21l should be formed in an inner wall surface of the single continuous surrounding wall.

The structure of the clutch 20 of the above embodiment, the shape of each component of the clutch 20, the number of components of the clutch 20, etc. can be modified in any appropriate ones.

In the above embodiment, the clutch 20 is used as the coupling means for coupling between the rotatable shaft 6 and the worm shaft 23. However, the coupling means for coupling between the rotatable shaft 6 and the worm shaft 23 can be embodied by any other device other than the clutch.

The structure of the motor main body 2 and the structure of the speed reducing unit 3 of the above embodiment can be modified in any appropriate way. For example, a control circuit board for controlling rotation of the motor 1 can be received in the speed reducing unit 3 (gear housing 21).

In the above embodiment, the invention is embodied in the motor 1, which is used as the drive source of the power window system installed in the vehicle door. However, the invention can be embodied in a motor, which is used, for example, in a sunroof system or any other system or device. Also, the invention can be embodied in any other motor that is not used in the vehicles.

Additional advantages and modifications will readily occur to those skilled in the art. The invention in its broader terms is therefore, not limited to the specific details, representative apparatus, and illustrative examples shown and described.

What is claimed is:

1. A motor comprising:

a motor main body that includes a rotatable shaft, wherein the rotatable shaft is rotated upon energization of the motor main body;

a speed reducing unit that is connected to the motor main body and includes a worm shaft, wherein the worm shaft is rotatably supported and is substantially coaxial with the rotatable shaft; and a coupling means for coupling between the rotatable shaft and the worm shaft, wherein the coupling means retains lubricant; and a stopper that restrains axial movement of at least part of the coupling means, wherein:

the speed reducing unit further includes at least one surrounding wall arranged radially outward of the coupling means, wherein each of the at least one surrounding wall has a single axial length and an end surface arranged on a motor main body side of the at least one surrounding wall, and the end surface of each of the at least one surrounding wall is engaged with the stopper; and the coupling means is substantially entirely surrounded by at least one of the stopper and the at least one surrounding wall in an imaginary plane, which is substantially perpendicular to the axis of the worm shaft, to substantially restrain radially outward effluence of the lubricant.

2. A motor according to claim 1, wherein:

the speed reducing unit further includes a gear housing that rotatably supports the worm shaft therein; and the at least one surrounding wall is formed integrally with the gear housing.

3. A motor according to claim 1, wherein:

the coupling means is a clutch;

the clutch transmits rotational force of the rotatable shaft, which is rotated upon energization of the motor main body, to the worm shaft; and the clutch restrains rotation of the worm shaft when rotational force is applied to the worm shaft from a load side.

4. A motor according to claim 3, wherein:

the clutch includes a collar, which is non-rotatably held to serve as a main restraining point for restraining rotation of the worm shaft when the rotational force is applied to the worm shaft from the load side;

the collar includes at least one first side engaging portion that restrains rotation of the collar; and the at least one surrounding wall defines at least one second side engaging portion, which restrains rotation of the collar upon engagement with the at least one first side engaging portion in a rotational direction.

5. A motor according to claim 4, wherein:

the collar includes a flange, which is arranged at an axial end of the collar on a motor main body side of the collar and has a polygonal outer periphery;

the at least one first side engaging portion includes the flange of the collar;

the at least one surrounding wall radially inwardly defines a flange engaging recess, which is engaged with the flange of the collar and has a shape that substantially coincides with the shape of the outer periphery of the flange; and the at least one second side engaging portion includes the flange engaging recess.

6. A motor according to claim 5, wherein the polygonal outer periphery of the flange of the collar is generally hexagonally shaped.

7. A motor according to claim 5, wherein:

the collar further includes at least one engaging projection, which extends radially outward from the flange;

the at least one first side engaging portion further includes the at least one engaging projection of the collar;

the at least one surrounding wall further defines at least one projection engaging recess, each of which receives and engages a corresponding one of the at least one engaging projection; and the at least one second side engaging portion further includes the at least one projection engaging recess.

8. A motor according to claim 1, wherein:

the stopper includes a central through hole, which axially penetrates through the stopper and receives a corresponding portion of the coupling means; and an inner circumferential edge of the stopper, which surrounds the central through hole of the stopper, is located radially inward of the at least one surrounding wall.

* * * * *